(12) United States Patent
Petiot et al.

(10) Patent No.: US 9,611,030 B2
(45) Date of Patent: Apr. 4, 2017

(54) ENERGY ABSORPTION DEVICE FOR AIRCRAFT STRUCTURAL ELEMENT

(71) Applicant: EUROPEAN AERONAUTIC DEFENCE AND SPACE COMPANY EADS FRANCE, Paris (FR)

(72) Inventors: Caroline Petiot, Les Ulis (FR); Michel Bermudez, Suresnes (FR); Didier Mesnage, Saint-Cloud (FR)

(73) Assignee: AIRBUS GROUP SAS, Blagnac (FR)

( * ) Notice: Subject to any disclaimer, the term of this patent is extended or adjusted under 35 U.S.C. 154(b) by 85 days.

(21) Appl. No.: 14/655,135

(22) PCT Filed: Dec. 16, 2013

(86) PCT No.: PCT/EP2013/076731
§ 371 (c)(1),
(2) Date: Jun. 24, 2015

(87) PCT Pub. No.: WO2014/102082
PCT Pub. Date: Jul. 3, 2014

(65) Prior Publication Data
US 2015/0344125 A1    Dec. 3, 2015

(30) Foreign Application Priority Data
Dec. 27, 2012  (FR) .................................... 12 62895

(51) Int. Cl.
*B64C 1/00* (2006.01)
*B64C 7/00* (2006.01)
(Continued)

(52) U.S. Cl.
CPC ................ *B64C 7/00* (2013.01); *B64C 1/062* (2013.01); *B64C 3/20* (2013.01); *B64C 11/205* (2013.01);
(Continued)

(58) Field of Classification Search
CPC .. B64C 1/06; B64C 1/063; B64C 7/00; B64C 11/20; B64C 11/205; B64C 11/26;
(Continued)

(56) References Cited

U.S. PATENT DOCUMENTS 4,302,155 A * 11/1981 Grimes .................... B64C 11/26
416/144
5,624,622 A * 4/1997 Boyce ................... B29C 44/569
264/258
(Continued)

FOREIGN PATENT DOCUMENTS

DE    10 2010 027696 A1    1/2012
EP        0 030 129 A2      6/1981
(Continued)

*Primary Examiner* — Richard G Davis
(74) *Attorney, Agent, or Firm* — Im IP Law; C. Andrew Im

(57) ABSTRACT

A device for absorbing kinetic energy for an aircraft structural element undergoing a dynamic impact. The device includes an outer enclosure made from a braided composite material configured to preserve its integrity after an impact, a foam core, contained in the outer enclosure and to at least partially fill the outer enclosure. The foam core is configured to at least partially absorb the kinetic energy generated by the impact. Reinforcing elements are integrated at least partially into the foam core to dissipate, combined with the form core, the kinetic energy generated by the impact. The reinforcing elements includes discontinuous threads inserted into the foam core by stitching, and each discontinuous thread includes an L- or T-shaped head, folded down outside the outer enclosure.

13 Claims, 4 Drawing Sheets

(51) Int. Cl.
*B64C 1/06*     (2006.01)
*B64C 3/20*     (2006.01)
*B64C 11/26*    (2006.01)
*F01D 21/04*    (2006.01)
*B64C 11/20*    (2006.01)

(52) U.S. Cl.
CPC ............ *B64C 11/26* (2013.01); *F01D 21/045* (2013.01); *B64C 2001/0072* (2013.01); *Y02T 50/433* (2013.01); *Y02T 50/672* (2013.01)

(58) Field of Classification Search
CPC ..... B64C 3/20; B64C 3/28; F01D 5/28; E04C 2/205
See application file for complete search history.

(56) References Cited

U.S. PATENT DOCUMENTS 6,740,381 B2 * 5/2004 Day .................... B29C 70/086
                                              428/309.9
9,289,927 B2 * 3/2016 Weber ................... B29C 44/56

FOREIGN PATENT DOCUMENTS

FR    2 748 719 A1   11/1997
GB    2 262 315 A     6/1993

* cited by examiner

ENERGY ABSORPTION DEVICE FOR AIRCRAFT STRUCTURAL ELEMENT

RELATED APPLICATIONS

This application is a §371 application from PCT/EP2013/076731 filed Dec. 16, 2013, which claims priority from French Patent Application No. 12 62895 filed Dec. 27, 2012, each of which is herein incorporated by reference in its entirety.

FIELD OF THE INVENTION

The invention relates to a passive energy absorbing device for an aircraft structural element such as a blade, a vane or any other element of a fan, wing structure or fuselage of an aircraft. This energy absorption device is designed to be integrated into a structural element of the aircraft so as to limit the risk of partial detachment or break up of the structural element in the event of an impact and thus reduce the vulnerability of this structural element to the threat of impact during flight of the aircraft.

The invention also relates to an aircraft rotary structural element comprising such a kinetic energy absorption device.

The invention finds applications in the field of aeronautics and notably in the field of rear-engined aircraft. It finds applications in particular in the field of the manufacture of turboprop engines and helicopter rotors and also in the field of the manufacture of composite vanes. The invention may also find applications in the manufacture of the leading edge regions of aircraft fixed wing structures or other structures that need to be resistant to impacts.

BACKGROUND OF THE INVENTION

It is known in the field of aeronautics that rotary structural elements and wing-structure elements are subjected to a high risk of impact from birds, hail, blocks of ice, stones or even pieces of tire or other hard debris encountered by the aircraft in flight, during landing or during takeoff.

The rotary elements associated with the engine or with the mobile wing structure of an aircraft, for example the fans or fan elements such as the vanes and blades of an aircraft, are particularly exposed to dynamic contact generated by birds or other debris that the aircraft may encounter. In particular, the composite blades of certain engines and helicopter blades are particularly vulnerable. Now, these impacts are very high energy impacts because the impact speed may be as high as 110 m/s. They may therefore prove particularly injurious to the rotary structural elements and, in extreme cases, cause the aircraft to crash.

In the case of aircraft engines with contrarotating fans and rear drive, the engines are generally situated near to the fuselage. Since this type of engine is generally unducted, impact on the rotary elements of the engine may cause an engine element or part of this engine element to detach, with all the consequences that has for the flight of the aircraft. There is therefore, upon an impact, a high risk of partial or complete detachment of a rotary element of the engine and of a chain reaction of the consequences as this detached element re-impacts another rotary element of the engine or an opposite engine.

Aeronautical manufacturers are therefore seeking to minimize as far as possible any partial or complete loss of rotary elements from the engines in the event of an impact by creating rotary structural elements that are able to withstand these impacts.

SUMMARY OF THE INVENTION

It is precisely an object of the invention to overcome the aforementioned disadvantages of the prior art. To this end, the invention proposes an energy absorption device for a structural element of an aircraft, such as an airplane fixed wing structure or blades, vanes or any other rotary element of an airplane or helicopter engine that makes it possible to reduce the threat associated with bird strike or impact with tire debris or other hard debris.

For that, the invention proposes to integrate, into the structural elements, a device that allows the kinetic energy generated by the impact to be absorbed passively so as to prevent the structural element from breaking up. This energy absorption device comprises an outer casing made of a braided composite that is resistant to breakup and a foam core incorporating reinforcing elements capable of dissipating the kinetic energy generated by the impact.

More specifically, the invention relates to a kinetic energy absorption device for an aircraft structural element liable to be subjected to a dynamic impact, characterized in that it comprises:

an outer casing made of braided composite able, after impact, to maintain a degree of integrity, a foam core, contained inside the outer casing and able to fill said outer casing at least partially, said foam core being able at least partially to absorb the kinetic energy generated by the impact, and being able to be compacted so as to free up some volume as the casing deforms, and reinforcing elements incorporated at least in part into the foam core in order, in combination with the foam core, to dissipate the kinetic energy generated by the impact.

The kinetic energy absorption device of the invention may have one or more of the following features:

the outer casing comprises a plurality of plies of impregnated rovings braided with at least two dry fibers.

the fibers that are to be impregnated are made of carbon, of aramid and/or of PBO.

the reinforcing elements comprise continuous filaments inserted into the foam core by stitching and forming loops within the foam.

the reinforcing elements comprise discontinuous filaments inserted into the foam core by stitching.

the discontinuous filaments each comprise an L-shaped or T-shaped head folded over onto the outside of the outer casing.

the filaments are impregnated with a curable resin.

the filaments are stitched into the foam core at evolving angles.

the reinforcing elements comprise internal partitions passing through the foam core and creating compartments within the foam.

the reinforcing elements are made of carbon and/or of aramid.

the reinforcing elements comprise a set of nails each consisting of a shank, of a spike and of a solid carbon head or counterblow (metal or carbon pellet) thus encouraging the nail to hold together as it breaks up, the nails being surrounded by a braid of carbon fiber, aramid fiber or the like.

the foam core comprises a rear part surrounding the nails and a front part made of an elastic material positioned facing the spikes of the nails so as to spread the kinetic energy generated by the impact at various angles of inclination.

The invention also relates to a kinetic energy absorption device for an aircraft structural element liable to be subjected to a dynamic impact, characterized in that it comprises:
- an outer casing made of braided composite able, after impact, to maintain its integrity,
- a foam core, contained inside the outer casing and able to fill said outer casing at least partially, said foam core being able at least partially to absorb the kinetic energy generated by the impact, and being able to be compacted so as to free up some volume as the casing deforms, and
- discontinuous filaments inserted into the foam core by stitching to form reinforcing elements which, in combination with the foam core, dissipate the kinetic energy generated by the impact, these discontinuous filaments each having an L-shaped or T-shaped head folded over onto the outside of the outer casing.

Furthermore, the invention relates to an aircraft rotary structural element comprising a leading edge and a trailing edge, characterized in that it comprises a kinetic energy absorption device as described hereinabove situated in a region of the leading edge.

DETAILED DESCRIPTION OF EMBODIMENTS OF THE INVENTION

The invention proposes a kinetic energy absorption device of the passive type intended to be integrated into an airplane fixed wing structure or into a blade, a vane or any other rotary structural element of an airplane or a helicopter or any other structure that needs to be resistant to impacts. Whether fixed or rotary, the element into which the kinetic energy absorption device is integrated will hereinafter be referred to as structural element. This structural element is intended, on the one hand, to absorb or dissipate the kinetic energy generated by an impact and, on the other hand, to prevent the structural element breaking up or becoming dislocated so that it maintains its integrity even in the event of an impact.

Figure 1:
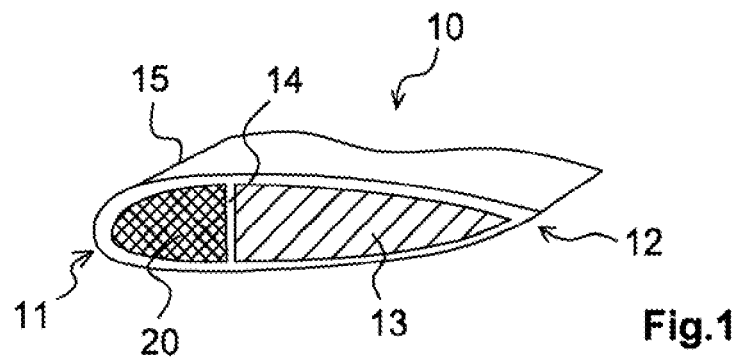
FIG. 1 depicts a view in cross section of one example of an aircraft rotary structural element provided with the energy absorption device of the invention.

One example of a structural element able to accommodate the kinetic energy absorption device of the invention is depicted in FIG. 1. This FIG. 1 shows the example of a blade viewed in cross section. This blade 10 has a shape of oblong cross section with, at the front, a leading edge 11 and, at the rear, a trailing edge 12 opposite the leading edge.

This blade 10 comprises a blade casing 15 inside which a blade body 13 is housed. The blade casing 15 also contains the kinetic energy absorption device 20 of the invention. This kinetic energy absorption device 20 is placed in the region of the leading edge 11 of the blade. Indeed, in an impact, it is the region of the leading edge 11, situated on the outside of the fan, that is first to take the impact. It is therefore this region 11 that needs to be capable of absorbing the kinetic energy generated by the impact.

In order to ensure unity between the blade body 13 and the kinetic energy absorption device 20, a device/blade body interface 14 is positioned between the kinetic energy absorption device 20 and the blade body 14 and holds the kinetic energy absorption device against the blade body inside the blade casing 15.

It should be noted that FIG. 1 depicts one example of a blade. However, any structural element is formed in a similar way from an element casing, an element body, an interface and the kinetic energy absorption device of the invention. Thus, whatever the structural element considered (blade, vane, fixed wing structure, etc.), this element comprises a leading edge in which the kinetic energy absorption device of the invention is housed.

According to the invention, the kinetic energy absorption device comprises a foam core and reinforcing elements housed inside an outer casing. This outer casing of the kinetic energy absorption device may constitute the blade casing 15. The outer casing therefore surrounds the foam core and the reinforcing elements and the blade body 13. In that case, the entirety of the blade casing 15 is made in the same way as the outer casing as will be described later on.

Figure 2A:
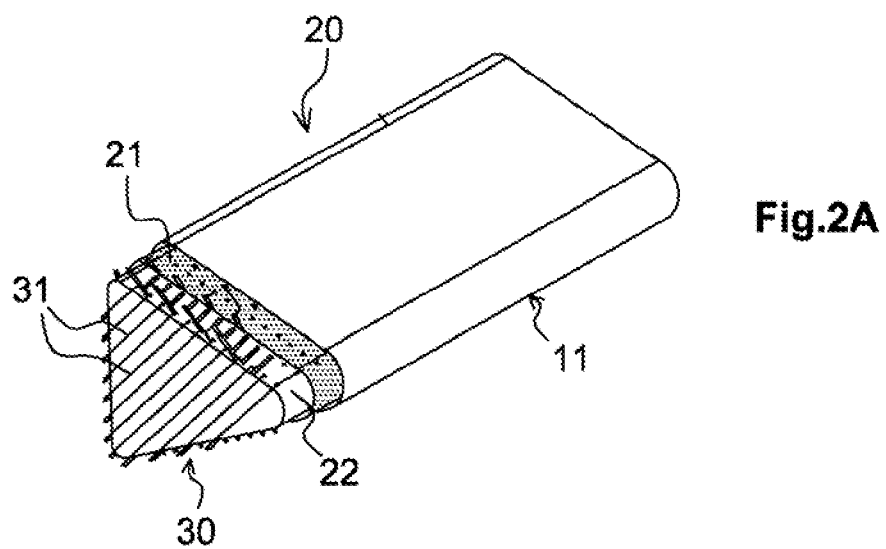
FIGS. 2A and 2B depict the energy absorption device of the invention with a first embodiment of the reinforcing elements.
Figure 2B:
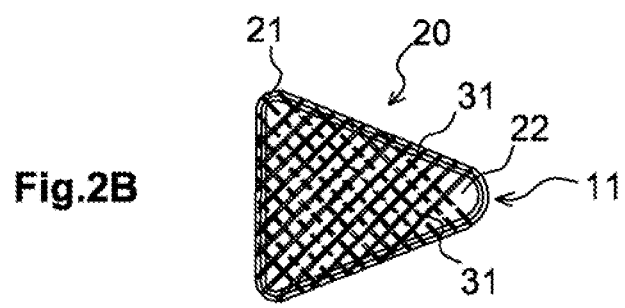

One example of this kinetic energy absorption device is depicted in FIGS. 2A and 2B.

FIG. 2A depicts a partially exploded perspective view of a kinetic energy absorption device according to the invention. FIG. 2B depicts a view in cross section of this same kinetic energy absorption device. These FIGS. 2A and 2B show the kinetic energy absorption device of the invention according to a first embodiment of the reinforcing elements.

The kinetic energy absorption device 20 of the invention comprises an outer casing 21 the role of which is to maintain the integrity of the shape of the structural element as far as possible after an impact. This outer casing 21, which will be described later on, is filled with a foam core 22 the role of which is, on the one hand, to stiffen the outer casing 21 and, on the other hand, to absorb at least some of the kinetic energy generated by the impact and to be able to become compacted so as to free up some volume as the casing deforms.

This foam core 22 comprises within it reinforcing elements 30 which allow the kinetic energy resulting from the impact and which has not been absorbed by the foam core 22 to be dissipated. This dissipation of the kinetic energy by the reinforcing elements 30 may be achieved by successive breakage of the reinforcing elements, by delamination or even by rubbing.

The kinetic energy absorption device with its outer casing 21, its foam core 22 and its reinforcing elements 30, is intended to be integrated into an industrial product such as a blade or any other structural element. The kinetic energy absorption device of the invention therefore has to be able to interface with the industrial product in order to provide that product with integrity. Thus the outer casing 21 of the kinetic energy absorption device contains the foam core 22 and the reinforcing elements 30 of the invention, but may also contain other elements forming part of the industrial product.

The outer casing 21 of the kinetic energy absorption device of the invention forms a kind of cover which surrounds and contains a foam core 22 and reinforcing elements 30. The assembly is able to dissipate the kinetic energy originating from the impact without breaking up, thereby making it possible to avoid any risk of a chain-reaction of impacts. In order to do so, the outer casing 21 needs to be able to achieve a high level of deformation at the moment of impact without losing its integrity. It therefore has to have plastic deformation behavior. According to the invention, the outer casing 21 is made of braided composite materials. In other words, the outer casing 21 constitutes a braid of composite fibers. This braid comprises a plurality of preimpregnated rovings based on single-direction carbon reinforcers (the direction being the lengthwise direction of the structural element), providing the interface with the blade body or the body of any other structural element. It may in particular comprise two to four plies of preimpregnated rovings. The braid also comprises layers of dry preforms braided with the preimpregnated rovings. In that case, the braid is a 2D braid, which means to say a braid in two dimensions.

The composite braid may also be a 3D braid, namely a braid in three dimensions. In that case, the composite braid comprises, in addition to the 2D braid, a reinforcement in the thickness. The meshing of the braid is therefore more dense and contributes to absorbing energy.

Whatever the type of braid, 2D or 3D, the fibers of which this braid is formed may be either carbon fibers, aramid fibers, aramid rovings braided with carbon or alternatively PBO (polyphenylene-2,6-benzoisoxazole) fibers. Carbon fiber has the advantage of offering dissipation by breakage even when the carbon fiber is in the outer casing. What is more, a carbon-carbon fiber braid therefore allows energy to be dissipated by the rubbing together of the energy.

Aramid has the advantage of being a more flexible material which deforms. Aramid fibers do not break often but do deform. An aramid braid therefore has the advantage of following the deformation of the foam core and also allows the energy to be dissipated by friction rubbing.

It will therefore be appreciated that braiding carbon fibers with aramid fibers may bring with it the advantage of dissipation through breakage associated with dissipation through rubbing or deformation of the product. In other words, in a configuration involving aramid, the aramid will provide the ability to deform and guarantee that the device holds together during impact. A PBO braid will have advantages somewhat similar to aramid. In the configuration of a carbon-aramid hybrid casing, the carbon contributes to reducing the depth of impact and to dissipating the kinetic energy through the breakage of the fibers.

The foam core of the structural element of the invention is made of a foam that may have varying degrees of density. Whatever its density, the purpose of the foam is to at least partially fill the outer casing and give it stiffness. It also allows the reinforcing elements to be held in place.

The density of the foam may vary between 50 kg/m3 and 200 kg/m3. A higher-density foam has the advantage of absorbing a greater amount of kinetic energy. A lower-density foam has the advantage of lightening the kinetic energy absorption assembly as a whole, which corresponds to the ever-present desire in aeronautics to reduce the overall mass of the aircraft. Furthermore, a lower-density foam has the advantage that it can be injected, which allows for easier incorporation of the reinforcing elements. Whatever its density, the foam guarantees that the kinetic energy absorption device remains stable during operation.

This foam may or may not have a hollow shape. In other words, the foam core may have a hollow center. The foam then merely forms an interface with the outer casing in order to give the casing rigidity.

The foam core 22 is provided with reinforcing elements 30. These reinforcing elements 30 allow the kinetic energy from the impact to be dissipated. Various reinforcing elements can be used individually or in combination with one another. Various embodiments of the reinforcing elements will now be described separately, in the knowledge that these can be combined with one another.

A first embodiment of the reinforcing elements 30 is depicted in FIGS. 2A and 2B. These reinforcing elements are relatively flexible filaments 31 which are placed through the foam core 22 by stitching. These filaments 31 may be continuous filaments or discontinuous filaments. They may be placed in the foam core 22 at regular intervals or at irregular intervals. It will be appreciated that the tension in the filament differs according to whether the filament is continuous or discontinuous. In the case of a continuous filament, the break point of the filament is situated in the returns of the filament, namely in the loop situated within the foam core. In the case of discontinuous filaments, breakage occurs from one end of the filament to its other end. In the example of FIG. 2A, the filaments are parallel in the foam core, directed longitudinally with respect to the leading edge. In the example of FIG. 2B, filaments 31$a$ are positioned at right angles to filaments 31$b$ so as to form a grid structure allowing kinetic energy to be dissipated at various angles of incidence.

Figure 3A:
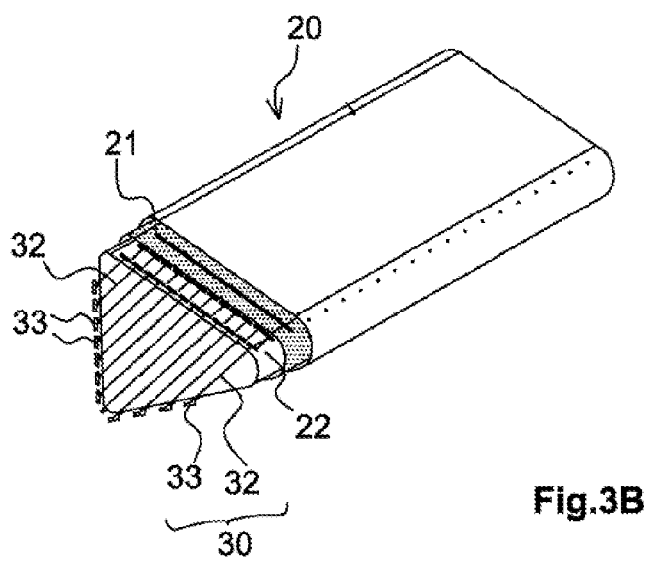
FIGS. 3A and 3B depict the energy absorption device of the invention with a second embodiment of the reinforcing elements.
Figure 3B:
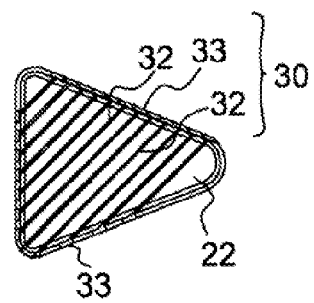

FIGS. 3A and 3B show a second embodiment of the reinforcing elements 30 of the kinetic energy absorption device. FIG. 3A depicts a partially exploded perspective view of the kinetic energy absorption device and FIG. 3B depicts a view in section of this kinetic energy absorption device. In this embodiment, the reinforcing elements 30 are discontinuous filaments 32 each provided with an L-shaped or T-shaped head 33. In the example of FIGS. 3A and 3B, the heads are T-shaped. Whether the head 33 is L-shaped or T-shaped it is positioned at the end of the filament 32 outside the foam core 22. Each discontinuous filament 32 is therefore stitched through the foam core 22 and its end is folded over onto the outside of the foam core to form the head 33. In order to allow the overlengths of filaments 32 to be folded over onto the external wall 23 of the foam core 22 to form the head 33, a tacky binder is applied to the overlength of filament 32. Thus formed, the L-shaped or T-shaped head 33 of the discontinuous filament 32 sticks to the outer casing 21. In such an embodiment, the L-shaped or T-shaped head will snap off in the event of an impact, allowing some of the kinetic energy to be dissipated through breakage; another proportion of the kinetic energy will then be dissipated by the frictional rubbing of the filaments against the foam.

Figure 6A:
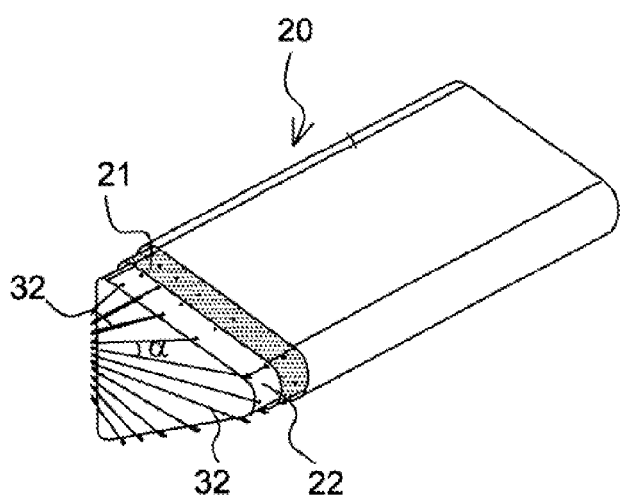
FIGS. 6A and 6B depict the energy absorption device of the invention with an alternative form of the reinforcing elements of FIGS. 2A and 2B.
Figure 6B:
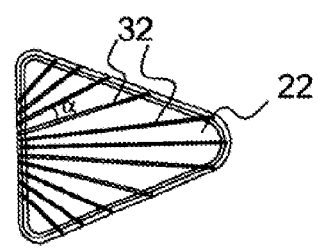
Figure 5C:
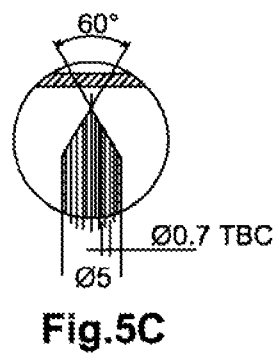
Figure 5D:
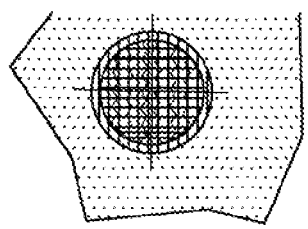

A third embodiment of the reinforcing elements is depicted in FIGS. 6A and 6B. In this embodiment, discontinuous filaments 32 are stitched at evolving angles α. In other words, these filaments 32 are stitched so that they make an angle that is non-zero but less than or equal to 45° with respect to one another. As depicted in FIGS. 6A and 6B, the stitching is distributed from a central region of the face of the foam core opposite to the leading corner and extends as far as the edge of the foam core that forms the leading edge. In the example of FIG. 6B, the angle α between two filaments 32 is around 20°. Such a layout of filaments allows energy to be dissipated at various angles of incidence.

Whatever the type of filament, whether continuous, discontinuous, with or without a head, these filaments may be impregnated by a curable resin which allows them, after they have been stitched, to harden so that they can break upon impact.

Figure 4A:
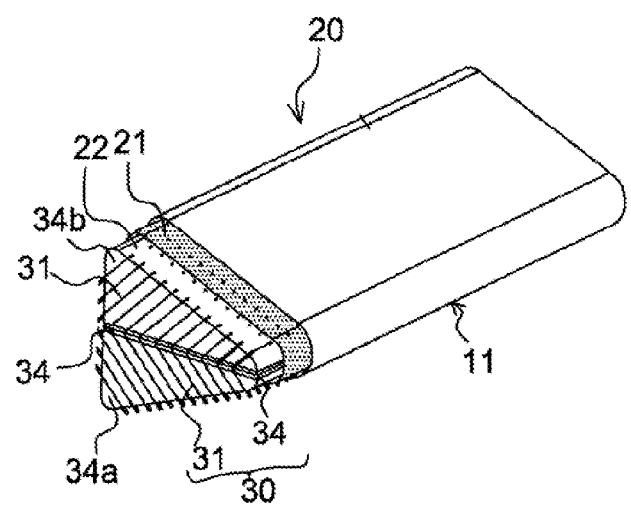
FIGS. 4A and 4B depict the energy absorption device of the invention with a third embodiment of the reinforcing elements.
Figure 4B:
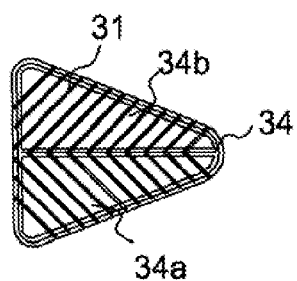

According to another embodiment, the reinforcing elements of the kinetic energy absorption device according to the invention may consist of partitions or walls separating the foam core into two or more partitioned compartments. FIGS. 4A and 4B respectively depict, in a partially exploded perspective view and in a view in cross section, one example of the partitioning of the foam core. In this example, just one partition 34 divides the foam core into two partitioned compartments 34a, 34b. This partition 34 is longitudinal, which means to say that it is directed at an angle of 0° with respect to the leading edge so that the two partitioned compartments each form a triangle. Thus, if an impact occurs along the leading edge of the structural element (which corresponds to the most probable point to sustain an impact) the partition 34 will break and thus dissipate the kinetic energy by breaking.

In an alternative form, several other partitions may be positioned in the foam core at different orientations in order to create partitions into multiple compartments. These partitions may be positioned longitudinally or indeed transversely. A plurality of longitudinal and transverse partitions may also be combined.

Each partition 34 is made of carbon fibers or aramid fibers impregnated with resin. It will be appreciated that, because of the resin, partitioned compartments 34a, 34b of the foam core form a one-piece element. As explained earlier, when the partition is made of carbon it will have a tendency to break up into several pieces upon impact, allowing energy to be dissipated through breakage. If the partition is made of aramid, it will crumple, concertina-style, and dissipate the energy by frictional rubbing and by deformation.

In the example of FIGS. 4A and 4B, the partitioned foam core not only holds the partition 34 but also holds the continuous or discontinuous filaments 31 in position. These filaments 31 are oriented transversely, with respect to the leading edge, allowing kinetic energy to be dissipated at several angles of incidence. These depictions show that various types of reinforcing elements can be combined in order to further increase the dissipation of energy upon impact.

FIGS. 5A, 5B, 5C and 5D depict another embodiment of the invention, in which the reinforcing elements are a set of nails 35. In this embodiment, each nail 35 is made up of a shank 35a which terminates, at one end, in a spike 35b and, at the other end, in a head 35d. The head 35d, the shank 35a and the spike 35b are of one piece, namely form one and the same single element made of carbon. The pointed end 35b, opposite to the head 35d of the set of nails, is conically chamfered, for example at an angle of 30°, so as, on the one hand, to allow all the nails to be introduced easily into the foam core 22 and, on the other hand, to allow the energy absorption device to be triggered stably. The shank 35a of the set of nails, which is situated between the head and the spike, is surrounded by a carbon braid 35c.

Figure 5A:
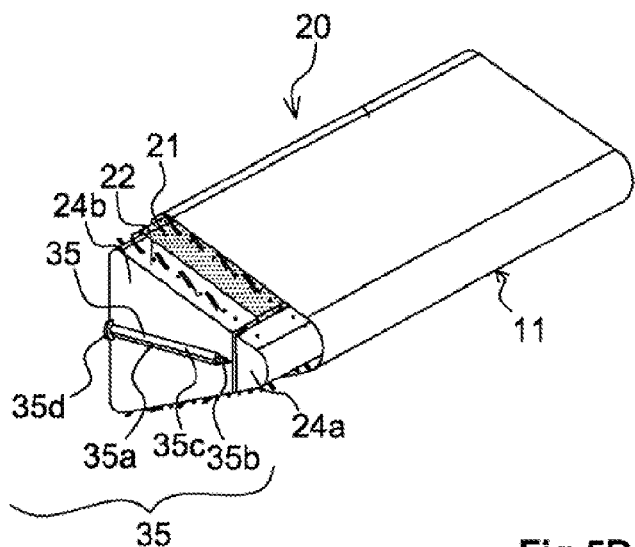
FIGS. 5A to 5D depict the energy absorption device of the invention with a fourth embodiment of the reinforcing elements.
Figure 5B:
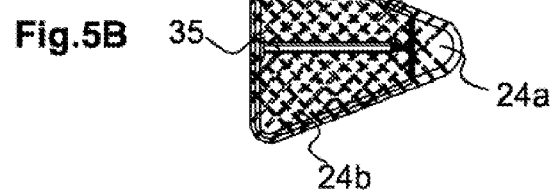

In the embodiment depicted in FIGS. 5A and 5B, the devices of all the nails (just one of which is visible in the figure) are positioned at an orientation of 0° from the leading edge. In other words, the nail is positioned facing the leading edge, which corresponds to the orientation for which the probability of an impact is the highest, although it is possible to orient them at other angles of incidence. Each set of nails 35 is positioned in the foam core 22 in such a way that its spike is close to the leading edge. Thus, in the event of an impact, all of the nails 35 will experience the impact on their spike 35b and break up little by little as the foam is pushed back by the impact. All of the nails together thus allow kinetic energy to be dissipated by multiple breakages, the carbon braid 35a deforming to allow greater fragmentation of the nail.

Several nails may be aligned in the foam core 22, which means to say may be distributed uniformly, parallel to one another. By contrast, the nails may be distributed unevenly with different orientations so as to allow energy from different angles of incidence to be dissipated. The spacing of all the nails and the density of each set of nails and diameter of these sets of nails may be adapted according to the structural element and according to the type of foam core used.

It will be appreciated that unlike the discontinuous filaments of FIGS. 2A and 2B which are discrete connections stitched into the foam core at angles that evolve in order to be effective at various angles of impact, the sets of nails are larger-diameter elements intended to absorb a greater amount of energy but at more limited angles of impact.

In an alternative form of this embodiment, the foam core 22 is made up of a front part 24a and of a rear part 24b. The rear part 24b corresponds to the foam core 22 as described earlier. This rear part 24b is transpierced with nails 35. The front part 24a may be a foam with a density different from that of the rear part 24b, with different elasticity. Such a foam, whether or not combined with a partition, allows the kinetic energy generated by the impact to be spread to several nails and over a larger angle of incidence so that a maximum number of nails of the kinetic energy absorption device dissipate the energy. The impact is thus spread over a maximum number of nails rather than simply over the nails situated facing the location of the impact. The foam in the front part 24a of the foam core may, for example, be an elastomer for its shock-absorbing capacity or a foam of greater density different (for example higher) than that of the rear part 24b of the foam core and the capacity of which allows energy to be absorbed.

This embodiment with nails may be combined with the embodiments described previously such as the embodiment with the stitched filaments or even the embodiment with the partitions. The depiction in FIGS. 5A and 5B corresponds to the combining of the reinforcing elements in the form of nails and those in the form of filaments stitched into the foam core.

In general, the various embodiments of the reinforcing elements which have been described hereinabove can be combined with one another to increase the dissipation of energy by covering various angles of incidence of impact. All the embodiments described hereinabove allow a mechanism that is progressively tripped in the dissipation of energy. In this way, the foam core is destroyed to a greater or lesser extent according to the amount of kinetic energy developed in the impact.

The invention claimed is:

1. A kinetic energy absorption device for an aircraft structural element subjected to a dynamic impact, comprising:
   an outer casing made of a braided composite configured to maintain its integrity after an impact;
   a foam core contained inside the outer casing and at least partially filling the outer casing, the foam core configured to at least partially absorb kinetic energy generated by the impact;
   reinforcing elements in combination with the foam core to dissipate the kinetic energy generated by the impact, the reinforcing elements are incorporated at least in part into the foam core and comprises discontinuous filaments inserted into the foam core by stitching; and each discontinuous filament comprises an L-shaped or T-shaped head folded over onto an outside of the outer casing.

2. The kinetic energy absorption device as claimed in claim 1, wherein the outer casing comprises a plurality of plies of impregnated rovings braided with at least two dry fibers.

3. The kinetic energy absorption device as claimed in claim 2, wherein the impregnated rovings and the dry fibers are made of at least one of the following: carbon, aramid or polyphenylene-2,6-benzoisoxazole.

4. The kinetic energy absorption device as claimed in claim 1, wherein the reinforcing elements comprise continuous filaments inserted into the foam core by stitching and forming loops within the foam core.

5. The kinetic energy absorption device as claimed in claim 4, wherein the continuous filaments are impregnated with a curable resin.

6. The kinetic energy absorption device as claimed in claim 4, wherein the continuous filaments are stitched into the foam core at evolving angles.

7. The kinetic energy absorption device as claimed in claim 1, wherein the reinforcing elements comprise at least one internal partition passing through the foam core to generate compartments in the foam core.

8. The kinetic energy absorption device as claimed in claim 1, wherein the reinforcing elements are made of at least one of the following: carbon or aramid.

9. The kinetic energy absorption device as claimed in claim 1, wherein the reinforcing elements comprise nails, each nail comprising a shank surrounded by a braid of carbon fiber, a spike and a head made of carbon.

10. The kinetic energy absorption device as claimed in claim 9, wherein the foam core comprises a rear part surrounding the nails and a front part made of elastomeric material or foam having a density different than that of the rear part, the front part is placed facing the spikes of the nails to spread the kinetic energy generated by the impact at various angles of incidence.

11. An aircraft structural element comprising a leading edge, a trailing edge, and the kinetic energy absorption device as claimed in claim 1 situated in a region of the leading edge.

12. A kinetic energy absorption device for an aircraft structural element subjected to a dynamic impact, comprising:

an outer casing made of a braided composite configured to maintain its integrity after an impact;

a foam core contained in the outer casing and at least partially filling the outer casing, the foam core configured to at least partially absorb kinetic energy generated by the impact; and discontinuous filaments inserted into the foam core by stitching to form reinforcing elements, the reinforcing elements in combination with the foam core dissipate the kinetic energy generated by the impact, each discontinuous filament comprises an L-shaped or T-shaped head folded over onto an outside of the outer casing.

13. An aircraft structural element comprising a leading edge, a trailing edge, and the kinetic energy absorption device as claimed in claim 12 situated in a region of the leading edge.

\* \* \* \* \*